United States Patent
Frohne et al.

(10) Patent No.: US 8,646,490 B2
(45) Date of Patent: Feb. 11, 2014

(54) PIPELINE AND METHOD FOR PRODUCING THE SAME

(75) Inventors: Christian Frohne, Hannover (DE); Dipl.-Ing Klaus Schippl, Hannover (DE)

(73) Assignee: Nexans, Paris (FR)

( * ) Notice: Subject to any disclaimer, the term of this patent is extended or adjusted under 35 U.S.C. 154(b) by 421 days.

(21) Appl. No.: 12/843,984

(22) Filed: Jul. 27, 2010

(65) Prior Publication Data
US 2011/0036440 A1    Feb. 17, 2011

(30) Foreign Application Priority Data

Aug. 7, 2009    (EP) ..................................... 09305738

(51) Int. Cl.
*F16L 11/15*    (2006.01)
(52) U.S. Cl.
USPC ........... 138/121; 138/122; 138/142; 138/151; 138/171
(58) Field of Classification Search
USPC ................. 138/121, 122, 151, 142, 171
See application file for complete search history.

(56) References Cited

U.S. PATENT DOCUMENTS

| | | | | |
|---|---|---|---|---|
| 3,330,303 A * | 7/1967 | Fochler | ........................ | 138/120 |
| 3,582,536 A * | 6/1971 | Miller | ...................... | 174/102 D |
| 6,155,303 A * | 12/2000 | Krawietz et al. | .............. | 138/135 |
| 6,186,182 B1 * | 2/2001 | Yoon | .............................. | 138/122 |
| 6,941,972 B2 * | 9/2005 | Toliver et al. | .................... | 138/26 |
| 7,232,597 B2 * | 6/2007 | Iwata et al. | ................... | 428/36.9 |
| 7,448,469 B2 * | 11/2008 | Seyler et al. | .................. | 181/249 |
| 7,909,535 B2 * | 3/2011 | Samara | .......................... | 405/45 |
| 2005/0229990 A1 * | 10/2005 | Hilgert | ......................... | 138/121 |
| 2010/0170590 A1 * | 7/2010 | Juuti | ............................. | 138/121 |

FOREIGN PATENT DOCUMENTS

| | | |
|---|---|---|
| DE | 10241504 | 3/2004 |
| DE | 10355475 | 6/2005 |

* cited by examiner

*Primary Examiner* — James Hook
(74) *Attorney, Agent, or Firm* — Sofer & Haroun, LLP

(57) ABSTRACT

A pipeline for the transport of a pressurized flowable medium, consisting of a metal tube corrugated transversely to its longitudinal direction and of a hose which is arranged in the same and consists of plastic. In the position of use the hose bears against the inwardly pointing wave troughs of the metal tube, which hose has a multiplicity of holes separated from one another in the wall of the same over its entire axial length. The wave troughs of the metal tube penetrate slightly into the surface of the hose so as to fix the latter with respect to axial loads.

2 Claims, 1 Drawing Sheet

PIPELINE AND METHOD FOR PRODUCING THE SAME

RELATED APPLICATION

This application claims the benefit of priority from European Patent Application 09 305 738.8, filed on Aug. 9, 2009, the entirety of which is incorporated by reference.

BACKGROUND

1. Field of the Invention

The invention relates to a pipeline for the transport of a pressurized flowable medium, consisting of a metal tube corrugated transversely to its longitudinal direction and of a hose which is arranged in the same and consists of plastic and which, in the position of use, bears against the inwardly pointing wave troughs of the metal tube, in which a multiplicity of holes separated from one another are formed in the wall of the hose over its entire axial length, and also to a method for producing the pipeline (DE 103 55 475 B3).

2. Description of Related Art

Pipelines of this type are used for the transport of liquids and gases. They are easily bendable on account of the corrugated metal tube and are therefore simple to lay in place. In order to avoid a pressure loss, caused by the corrugation of the metal tube, of the medium to be transported and also flow noises and vibrations of the metal tube which may be manifested in a disturbing manner in its surroundings, a smooth hose made from plastic, which is also designated as a "liner", is mounted in the metal tube.

In the pipeline according to DE 102 41 504 A1, a pressure-resistant hose made from plastic is used, which is drawn into a prefabricated corrugated metal pipe. The pipeline is then heated to the softening temperature of the plastic used for the hose. The hose is subsequently acted upon with pressure, so that it comes to bear against the wave troughs of the metal tube and penetrates at least partially into the corrugation of the latter. When the pipeline is in operation, the pressurized medium to be transported may diffuse outwards through the wall of the hose. This leads gradually to a pressure build-up in the space between the metal tube and hose, with the result that the hose is subjected to high mechanical load. When the hose is relieved without medium to be transported, it therefore collapses on itself on account of the increased pressure acting from outside. The pipeline then has to be repaired again at high outlay or it is even no longer usable.

The known pipeline for carrying fluids according to DE 103 55 475 B3 mentioned above consists of a metallic hose which is corrugated transversely to its longitudinal direction and in which a perforated inner hose is arranged. The inner hose is mechanically connected at the ends of the pipeline to the metallic hose by means of a cold finger or adapter.

OBJECTS AND SUMMARY

The object on which the invention is based is to make the pipeline as mentioned in the introduction simpler and to specify a method for the simple production of the latter.

This object is achieved, according to the invention, on the one hand, in that the wave troughs of the metal pipe penetrate slightly into the surface of the hose so as to fix the latter with respect to axial loads.

It is achieved, according to the invention, on the other hand, in that, in a continuous operation, a slotted tube formed from a metal strip moved in the longitudinal direction and having a slot running in the longitudinal direction is arranged around the hose which is moved in its longitudinal direction and which has over its entire axial length holes piercing its wall, which slotted tube is provided, after the welding of the slot, with a corrugation running transversely with respect to its longitudinal direction, in such a way that the wave troughs of the corrugated metal tube penetrate slightly into the surface of the hose.

In this pipeline, the hose is, in functional terms, only a smooth-walled lining of the corrugated metal tube. Since it is not pressure-resistant, and even should not be; the material used for the hose is as far as possible of any type desired. It can easily be adapted to the requirements of the medium to be transported. The holes in the wall of the hose ensure that, during the transport of a pressurized medium, pressure equalization between the space surrounding the hose and the space enclosed by the hose takes place at any point on the pipeline. Consequently, a collapse of the hose on account of an uncontrolled pressure build-up in the space surrounding the hose is avoided. The pipeline is in this case, overall, pressure-resistant, and all the spaces enclosed by the metal tube have at any time defined pressure conditions. Since the metal tube projects slightly into the surface of the hose, moreover, the latter is fixed in a simple way with respect to axial loads in the corrugated tube. The method for producing the line pipe guarantees a continuous manufacture of the latter in any desired length.

A pipeline according to the invention and a device for a method for its production are illustrated as exemplary embodiments in the drawings.

DETAILED DESCRIPTION

Figure 1:
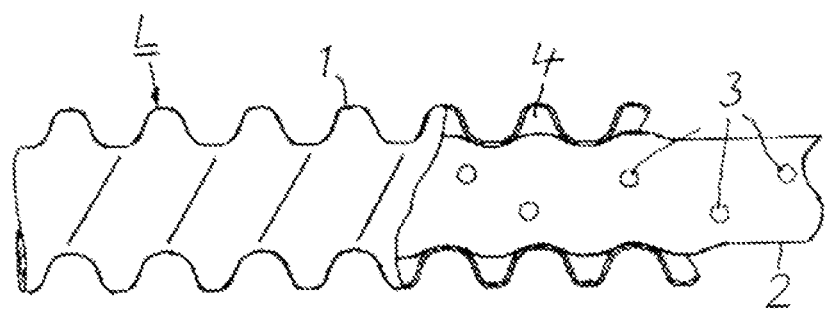
FIG. 1 shows a side view of a pipeline according to the invention, partially in section.
Figure 2:
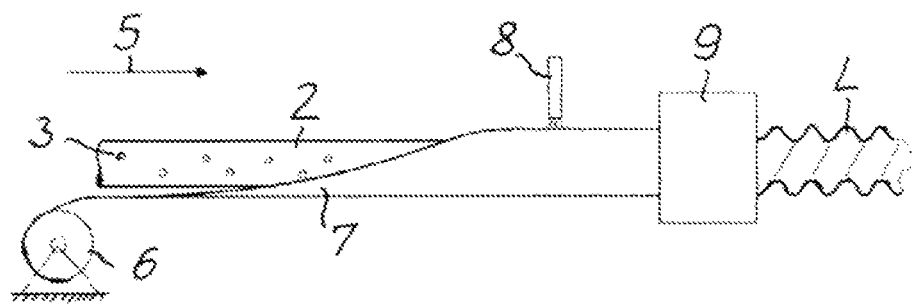
FIG. 2 shows a diagrammatic illustration of a device for producing a pipeline according to FIG. 1.

A pipeline L according to FIG. 1 consists of a metal tube 1 corrugated transversely to its longitudinal direction and of a hose 2 arranged in the same and made from plastic. Steel is advantageously used as material for the metal tube 1. The hose 2, preferably consisting of a polymeric material, is dimensioned so that the metal tube 1 projects or penetrates slightly with its wave troughs into the surface of the said hose, as might be seen from FIG. 1. The hose 2 is thereby additionally fixed with respect to axial loads in the metal tube 1.

The hose 2 has over its entire axial length a multiplicity of holes 3 which pierce its wall. The space 4 between the metal tube 1 and the hose 2 is connected via the holes 3 to the space enclosed by the hose 2. The holes 3 are separated from one another and are arranged so as to be distributed over the circumference of the hose 2. They advantageously have a clear width lying between 1 mm and 10 mm. Their distance from one another is, for example, to 1 cm to 10 cm.

The pipeline L is produced, for example, as follows:

A hose 2 is drawn off from a stock in the direction of the arrow 5 by a draw-off device, not illustrated. A metal strip 7 is drawn off, around the hose 2, from a reel 6 by means of the same draw-off device as is used for the hose 2 and is shaped, as it runs in longitudinally direction, into a slotted tube. The slotted tube has a slot which is open in the longitudinal direction and at which the two longitudinal edges of the metal strip 7 butt one against the other. The slot is thereafter welded in a welding device 8 in the same operation, so that a tube closed all-round is obtained. This tube is subsequently corrugated transversely to its longitudinal direction, likewise in the same operation, in a corrugating device 9. Downstream of the corrugating device 9, the finished pipeline L is present, which can be wound as an easily bendable structure onto a reel over a great length.

The depth of the corrugation of the metal tube 1 is set in the corrugating device 9 so that, according to FIG. 1, the said metal tube penetrates slightly with its inwardly pointing wave troughs into the hose 2 or its surface.

The corrugation of the metal tube 1 may be of helical or annular design. In the helical corrugation, a continuous space 4 running helically is present, and therefore the number of holes 3 in the hose 2 may be smaller than in an annular corrugation in which the space 4 consists of a multiplicity of subspaces running annularly.

The invention claimed is:

1. A pipeline for the transport of a pressurized flowable medium, comprising:
   a metal tube corrugated transversely to its longitudinal direction; and
   a hose, arranged in said metal tube, made of plastic and which, in the position of use, bears against the inwardly pointing wave troughs of the metal tube, said hose having a multiplicity of holes separated from one another formed in the wall of the hose over its entire axial length wherein said holes in the wall are configured to allow said pressurized flowable medium to exit said hose into said space between said hose and said metal tube such that a pressure inside said hose can substantially equal to said pressure between said hose and said tube, and
   wherein the wave troughs of the metal tube penetrate slightly into the surface of the hose so as to fix said hose with respect to axial loads.

2. Method for producing a metallic tube which is corrugated transversely to its longitudinal direction and in which a hose bearing against the inwardly pointing wave troughs and made from plastic is mounted, according to claim 1, wherein,
   in a continuous operation, a slotted tube, formed from a metal strip moved in the longitudinal direction and having a slot running in the longitudinal direction, is shaped around the hose which is moved in its longitudinal direction and which has over its entire axial length holes piercing its wall and separated from one another,
   the slotted tube is provided, after the welding of the slot, with a corrugation running transversely to its longitudinal direction in such a way that the wave troughs of the corrugated metal tube thereby obtained penetrate slightly into the surface of the hose.

\* \* \* \* \*